US 8,750,851 B2

(12) United States Patent
Le Thierry d'Ennequin

(10) Patent No.: US 8,750,851 B2
(45) Date of Patent: Jun. 10, 2014

(54) METHOD AND APPARATUS FOR PROVIDING ENHANCED ADDRESS BOOK WITH AUTOMATIC CONTACT MANAGEMENT

(75) Inventor: Christophe Le Thierry d'Ennequin, Paris (FR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 13/256,179

(22) PCT Filed: Oct. 21, 2009

(86) PCT No.: PCT/KR2009/006092
§ 371 (c)(1),
(2), (4) Date: Sep. 12, 2011

(87) PCT Pub. No.: WO2010/114205
PCT Pub. Date: Oct. 7, 2010

(65) Prior Publication Data
US 2012/0004015 A1 Jan. 5, 2012

Related U.S. Application Data

(60) Provisional application No. 61/164,462, filed on Mar. 29, 2009.

(51) Int. Cl.
*H04M 3/00* (2006.01)
(52) U.S. Cl.
USPC ........... 455/418; 455/415; 455/502; 455/566; 370/324; 370/350
(58) Field of Classification Search
USPC ................... 455/415, 502, 566; 370/324, 350
See application file for complete search history.

(56) References Cited

U.S. PATENT DOCUMENTS

| | | | |
|---|---|---|---|
| 7,634,463 B1* | 12/2009 | Katragadda et al. | 701/431 |
| 2004/0186848 A1* | 9/2004 | Kobashikawa et al. | 707/102 |
| 2006/0026198 A1* | 2/2006 | Emery et al. | 707/103 R |
| 2006/0286971 A1* | 12/2006 | Maly et al. | 455/415 |
| 2007/0229549 A1* | 10/2007 | Dicke et al. | 345/676 |
| 2008/0133580 A1* | 6/2008 | Wanless et al. | 707/102 |
| 2008/0280600 A1* | 11/2008 | Zhou | 455/415 |
| 2009/0150488 A1* | 6/2009 | Martin-Cocher et al. | 709/204 |
| 2009/0280786 A1* | 11/2009 | Ziklik | 455/415 |
| 2009/0300010 A1* | 12/2009 | Ratnakar | 707/5 |

FOREIGN PATENT DOCUMENTS

| | | |
|---|---|---|
| KR | 10-2003-0030195 A | 4/2003 |
| KR | 10-2003-0057745 A | 7/2003 |
| KR | 10-2008-0029110 A | 4/2008 |

OTHER PUBLICATIONS

Sang-Ho Lee, "Method of informing a remotely automatic renewal and synchronization of information using a radio network", Apr. 18, 2003, KR2003-0030195 A, Machine Translation.*

* cited by examiner

*Primary Examiner* — Liton Miah
(74) *Attorney, Agent, or Firm* — Birch, Stewart, Kolasch & Birch, LLP

(57) ABSTRACT

A method and apparatus for providing an enhanced address book with an automatic management of contact entries stored therein. According to an embodiment, the invention provides a mobile terminal including a mobile terminal address book; and a controller configured to automatically receive at least one contact entry from a remote device when a predetermined event occurs, to update the mobile terminal address book based on the received at least one contact entry, and to synchronize the updated mobile terminal address book with a network address book through a network.

9 Claims, 4 Drawing Sheets

51 — Name : Christophe
52 — Phone Number : 01 23 45 67 89
53 — Email : xx@xx.com
54 — Expiry date : 11.02.2010
55 — Location (*) : (48.856667, 2.350987); (35.689487, 139.6919706)
56 — Matching context(**): yes (*): The filed "locations" may contain, for example, a list of GPS coordinates.

(**): The filed "MatchContext" is set to "yes" if the current location of the user matches one of the locations indicated in the "Locations" filed.

METHOD AND APPARATUS FOR PROVIDING ENHANCED ADDRESS BOOK WITH AUTOMATIC CONTACT MANAGEMENT

CROSS REFERENCE TO RELATED APPLICATIONS

This application is the National Phase of PCT/KR2009/006092 filed on Oct. 21, 2009, which claims priority under 35 U.S.C. 119(e) to U.S. Provisional Application No. 61/164,462 filed on Mar. 29, 2009. The entire contents of all of the above applications are hereby incorporated by reference into the present application.

TECHNICAL FIELD

The present invention relates to a method, apparatus and system for providing enhanced address book and applications with automatic contact management.

BACKGROUND ART

Mobile terminals such as cell phones, smart phones, etc. are being developed with the increased capabilities for providing various services and functionalities which are user-friendly. Among the functions, the mobile terminals include an address book and an associated application for managing the address book. The address book generally stores therein a list of contacts and information association with each contact such as the contact's e-mails, phone numbers, addresses. However, there are still limitations associated with the manner in which the address books in the mobile terminals operate in the conventional mobile terminals.

For instance, in the address books of the conventional mobile terminals, the contact entries (address book entries) need to be created and deleted manually by the users of the mobile terminals. For example, if a new contact/person calls a particular mobile terminal, then the user of the particular mobile terminal has to select certain buttons or menu items to have the new person's phone number entered into the address book of the mobile terminal. Similarly, the user must manually operate certain buttons or menu items to remove a contact entry from the address book of the mobile terminal. These operations can be rather time consuming and tedious tasks for the users of the mobile terminals to perform.

Further, since the address book entries (e.g., additions, deletions, and modifications of contact entries) must all be managed manually by the user, as time goes by, the address book can easily grow into a large size too big to be reviewed and managed by the user manually. As a result, the address book often ends up containing many contact entries that are no longer useful to the user or no longer current to be used. To avoid this situation, the user has to review all the entries in the address book and delete or revise the entries as needed, on a regular basis, which is inconvenient.

Furthermore, because the user has to decide whether or not certain contact entries should be created, it puts burden on the user to make this decision each time the mobile terminal is used, e.g., when there is a new incoming call. As a result, many contacts some of which may be relevant may not be added to the address book, or too many contacts some of which are not relevant at all may be added to the address book by the user, because the user does not want to perform or does not actually perform the detailed management of the address book.

Moreover, the conventional address books in the mobile terminals show all contact entries to the users even though some contact entries may be useful only in certain situations or specific contexts such as time and place. As such, the user may need to review and scroll through a large list of contact entries to select a desired one, which is inefficient and time consuming to the user.

DISCLOSURE OF INVENTION

Solution to Problem

The present invention provides a method, apparatus and system for providing an enhanced address book and applications with automatic contact management.

The present invention provides a mobile terminal, network device and method for automatically managing an address book, which address the limitations and problems associated with the related art.

The present invention provides techniques and computer applications for providing address books with improved functionalities.

According to an embodiment, the present invention provides a mobile terminal comprising a mobile terminal address book; and a controller configured to automatically receive at least one contact entry from a remote device when a predetermined event occurs, to update the mobile terminal address book based on the received at least one contact entry, and to synchronize the updated mobile terminal address book with a network address book through a network.

According to another embodiment, the present invention provides a method of controlling a mobile terminal address book provided in a mobile terminal, comprising: automatically receiving, by the mobile terminal, at least one contact entry from a remote device when a predetermined event occurs; updating the mobile terminal address book based on the received at least one contact entry; and synchronizing the updated mobile terminal address book with a network address book through a network.

According to another embodiment, the present invention provides a mobile terminal comprising: a mobile terminal address book; a synchronization unit configured to synchronize the mobile terminal address book with a network address book through a network, the synchronized mobile terminal address book including at least one contact entry having at least one location information; and a controller configured to compare cell identification information of the mobile terminal with the at least one location information, and to update the mobile terminal address book to output at least one contact entry corresponding to a location associated with the cell identification information based on the comparison result.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein.

MODE FOR THE INVENTION

Hereinafter, exemplary embodiments of the invention will be described in detail with reference to the attached drawings. The embodiments described below are intended to exemplify the technical spirit of the invention, but are not intended to limit the scope of the invention. Components having the same reference numbers are preferably the same components, but may not necessarily be which may depend on the context of the description.

Figure 1:
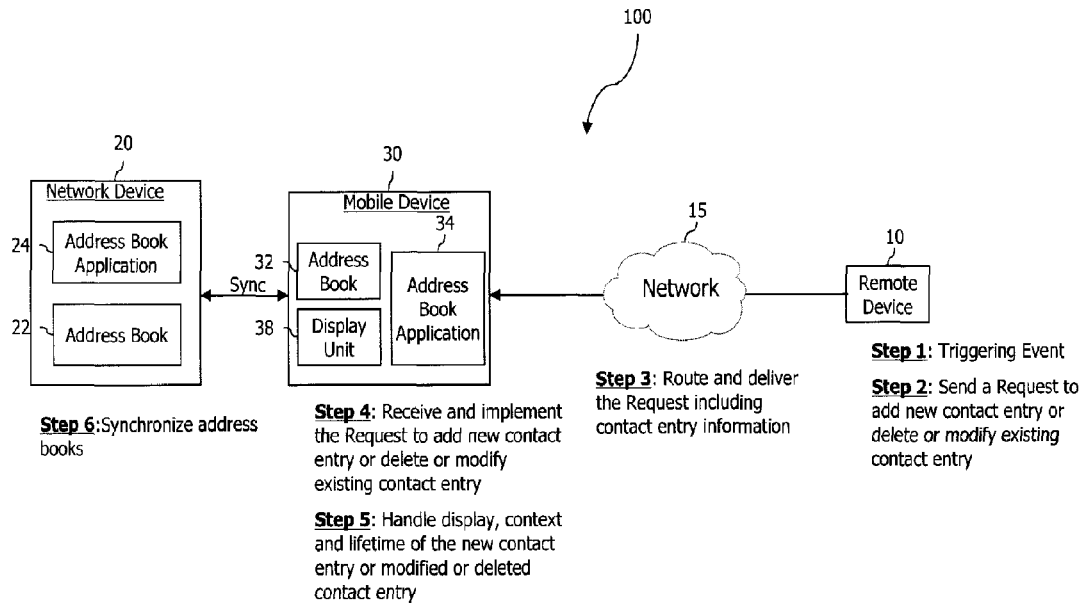
FIG. 1 is a diagram of a communication system and illustrates a method for providing an enhanced address book, according to an embodiment of the invention.

FIG. 1 is a diagram of a communication system 100 and illustrates a method for providing an enhanced address book according to an embodiment of the invention. As shown in FIG. 1, the system 100 includes a remote entity or device 10 such as a server or mobile terminal, a network device 20 such as a server or other entity in a network 15, a mobile device (also referred to herein as a mobile terminal) 30, and the network 15 through which all of these components can communicate with each other. All the components of the system 100 are operatively coupled and configured.

The mobile device 30 may be, e.g., a smart phone, pager, PDA (Personal Digital Assistant), UE (user equipment), mobile phone, desktop computer, computer notebook, computer tablet, work station, PC, etc. The network 15 can be any existing communication network, and the components of the system 100 may communicate with each other or other components in other networks wirelessly, through wired lines, contactlessly, through short-range networks, etc. The mobile device 30 includes an address book (or storage containing the address book) 32 for storing a list of contact entries such as contacts (e.g., people, businesses, etc.) for the user of the mobile device 30, an address book application 34 for managing and modifying the address book 32 and synchronizing the address book 32 with an address book or data at the network device 20's side, and a display 38 for displaying the address book and other data. The address book application 34 functions as a controller for controlling the operations associated with the address book 32. Further, a separate synchronization unit may be provided to perform the synchronization of the address book 32 with the address book or data at the network device 20's side. The mobile device 30 also can include conventionally known components such as a general controller or processors, an input unit, a communication interface, internal and/or removable memories, other applications and programs, etc.

The address book application 34 is an application that manages the address book 32 and performs operations such as displaying the content of the address book 32 to the user (e.g., via the display of the mobile device), synchronizing the mobile device's address book 32 with the network device's address book 22, and adding, deleting, and modifying contact entries in the address book 32.

The remote device 10 is an entity within the network such as a website server or device. The remote device 10 can include therein a controller or other entities, and is configured to detect if a triggering event has occurred and if so, generates and sends a request to add, delete, or modify a contact entry to the address book application 32 of the mobile device 30.

The network device 20 is an entity within the network side such as a server, and can include an address book 22 stored at the network device 20 or outside the network device 20 in the network, a controller or address book application 24 for controlling the operations associated with the address book 22 such as address book synchronization, etc. The address book application 24 is an application that manages the address book 22 and performs operations such as displaying the content of the address book 22 to the user (e.g., via the display of the mobile device), synchronizing the address book 22 with the mobile device's address book 32, and adding, deleting, and modifying contact entries in the address book 22. The network device 20 can communicate with the mobile device 30 through the network 15 via known channels and techniques.

Having described the components of the system 100, a method for providing an enhanced address book according to an embodiment of the invention will be described now in more detail referring to FIG. 1. This method is preferably implemented in the system of FIG. 1, but can be implemented in other suitable systems/devices.

Referring to FIG. 1, at step 1, the remote device 10 checks to see if a triggering event has occurred. The triggering event is an event that triggers the remote device 10 to generate and send a request to add, delete or modify a contact entry along with any associated contact entry information, to the mobile device 30. The triggering event can include, but is not limited to, e.g., (1) user making a reservation such as an airplane or hotel reservation, (2) the user subscribing to a service such as an online banking service, (3) user buying a product or service online or through the website, (4) user being detected within a particular range of an access point (which may be predefined), etc. The triggering event can be set by the administrators or operators of each remote device 10. When the user is performing the above examples (1)-(3), the remote device 10 provides some contact information or information associated with the remote device 10 so that the user can follow up on those transactions subsequently or get in touch with the appropriate customer services. Such contact information can then be stored automatically in the address book 32 of the mobile device 30 according to the invention. In the example (4), if the user is detected to be present within a certain range of certain access points, the present invention allows the user at the mobile device 30 to automatically receive contact information or other information related to the access point or local service. For instance, the user (mobile device 30) can automatically receive the contact number of a 'lost and found' service when the user carrying the mobile device 30 is within the premise of a train station or store. There are many other events which can be set as triggering events (e.g., by the user of the mobile device or network/service administrator or remote device 10), and the above examples are non-limiting examples and the invention encompasses other examples.

Triggering events can be static in that once they are set, they are not changed, or can be dynamic and can vary depending on the user, context, time, place, etc.

At step 2, when the remote device 10 detects that a triggering event has occurred, then the remote device 10 automatically creates and transmits a request to add a new contact entry or a request to delete or modify an existing entry to the mobile device. 30, e.g., through the network 15. This request to add, delete or modify a contact entry preferably contains the following information: (a) contact entry such as the entry to be added, deleted or modified, e.g., name, address, phone number, URL, call cost price, etc., and/or (b) context information (which may be optional information) that indicates when the corresponding contact entry should be made available to the user at the mobile device 30. The context information can also be part of the contact entry. The context information such as expiration date, location information such as GPS coordinates, lifetime duration information, etc. will be explained in more detail later when explaining step 5.

Each contact entry may include one or more of the following information which are mere examples:

Full name (e.g. title, first, middle, last and suffix);

Display name: an optional descriptive name suggested by the user to identify the contact person or business (e.g. nickname);

Addressing identifiers (e.g. CPM (Converged IP Messaging) address, instant messaging address, email address, phone number, SIP (Session Initiation Protocol) address, presence subscription address, gaming user identifier, etc.);

Basic personal data (e.g. birth date, description, gender, height, home address, etc.);

Extended personal data (e.g. areas of expertise, avatars data, hobbies, interests, photo or video data, title, etc.);

Web resources (e.g. homepage URL, weblog URL, publications URL, etc.); and/or

Organizational data (e.g. business category, department name, job title, alternative contact or agent, etc.).

At step 3, the network 15 routes and delivers the request to add, delete or modify a contact entry sent from the remote device 10 to the mobile device 30 associated with the user. Optionally at this time, some filtering operations may be performed within the network 15 according to the policies of the service provider serving the user/mobile device 30, and thereby confirm whether or not this request to add, delete or modify a contact entry should be delivered to the mobile device 30. If the policies associated with the user or the user's mobile device 30 indicate that the delivery of the request to add, delete or modify the contact entry is not desired or should not occur (e.g., user failed to pay for the phone service), then the network 15 (e.g., service provider or other entity) may block the delivery of the request to add, delete or modify the contact entry from the remote device 10 to the mobile device 30.

At step 4, the mobile device 30 receives the request to add, delete or modify the entry, and then stores and implements the request. For instance, the address book application 34 receives the request to add a new contact entry including the new contact entry and adds the received new contact entry to the address book 32. Further, the mobile device 30 or the address book application 34 can also update the address book 32 and any other component in the mobile device 30 to reflect the information received with the request to add, delete or modify the entry. That is, once the remote device 10 detects that one of the predetermined triggering events has occurred at step 1, steps 2, 3 and 4 are automatically performed.

At still step 4, optionally, the user may be notified of the newly added contact entry or the deletion/modification of an existing entry by causing the mobile device 30 to output a sound or vibration or display a text on the display 38 of the mobile device 30. Still optionally, the user may be asked to provide a confirmation of such addition, deletion or modification of a contact entry before it is actually implemented. The user can verify whether or not the addition, deletion or modification of a contact entry should be actually made to the address book 32 by, e.g., responding to a pop-up message on the screen of the mobile device 30. Further, if the address book application 34 receives a new contact entry from the remote device 10, which already exists in the address book 32, then the existing contact entry can be updated, as needed, automatically, with any information included in the received request to add the new contact entry. Moreover, once the new contact entry is added to the address book 32, the address book application 34 can reply back to the remote device 10 to provide a feedback on how the request was handled. For instance, the address book application 34 can indicate to the remote device 10 that the new contact entry was successfully added, the existing contact entry was successfully deleted or modified, or there was a problem (with a possible identification of the problem) and thus the request was not completed.

At step 5, the address book application 34 manages the address book 32 including the contact entries in various ways and as a result, controls the display and lifetime of the current contact entries in the address book 32. For instance, the address book application 34 displays the contact entries which are added automatically according to the invention in such a way, so that the user can distinguish them from the contact entries that the user entered manually. As one non-limiting example, the address book as displayed on the display 38 can be split into two windows or two separate list groups, one window/group showing the list of contacts that are automatically entered according to the invention, and the other window/group showing the list of contacts that are manually entered according to the conventional way. In another non-limiting example, the contact entries that are automatically entered into the address book 32 according to the invention can be displayed in bold, highlighted, or some other way to distinguish them from the display of the contact entries manually entered.

Further, the address book application 34 uses the context information to display only certain appropriate or relevant information or contact entry to the user on the display 38. The context information can be provided for each contact entry or only some contact entries. The context information associated with each contact entry in the address book 32 is preferably stored in the address book 32 or other storage. Some context information is received from the remote device 10 at step S2 and some context information may be generated and/or updated by the address book application 34 based on various information available to the mobile device 30. The context information is any information indicating a context or characteristic of the corresponding contact entry, and can be, e.g., location information (e.g., GPS information) associated with a corresponding contact entry, lifetime information (e.g., expiration date(s)) associated with a corresponding contact entry, etc. The location information associated with a particular contact entry can indicate one or more locations in which the particular contact entry should become visible or available to the user. For example, if one contact entry is automatically added to the address book with a specific GPS location associated thereto, then the address book application 34 controls the display such that, that contact entry in the address book 32 will be visible or available to the user at the mobile device 30 only when the user is at that specific GPS location. The lifetime information can indicate an expiration date or a lifetime duration of a contact entry within the address book 32. For example, the following contact entry with the associated lifetime information may be stored in the address book 32:

| CONTACT ENTRY NAME | CONTACT ENTRY DATA | CONTEXT |
|---|---|---|
| Credit card stolen number | 1-800-111-1111 | Expiration date: Nov. 01, 2011 |
| Hotel reservation number | 1-888-555-5555 | Lifetime duration: 1 year from May 05, 2009 |

When a particular contact entry reaches the expiration date or its lifetime has expired according to the lifetime information, then the address book application 34 automatically deletes the contact entry from the address book 32. In the above example, when the date Nov. 1, 2001 arrives, then the 'Credit card stolen number' contact entry would be automatically deleted from the address book since that contact entry is expired. This feature is advantageous since old entries can be cleaned up automatically and effectively, so as to maintain the address book that is current and reasonable in size. Further, if desired, the user can change the lifetime information for any of the contact entries in the address book 32 so that if desired, the contact entries can remain longer or removed sooner in or from the address book according to the user's preference and need.

At step 6 which may be an optional step, the address book 32 of the mobile device 30 is synchronized with the address book 22 of the network device 20 via known synchronization techniques such as OMA DS (Open Mobile Alliance Data Synchronization) methods. The synchronization operation makes on the network's address book 22 the same changes made on the address book 32 of the mobile device or vice versa (e.g., in the method of FIG. 2). As mentioned, OMA DS is an example of protocol that could be used to synchronize the address books 22 and 32 to each other. In this protocol, the mobile device (client) and the network device (server) can send each other the changes that were made on the phonebook (address book) since the last synchronization. Such changes could be the addition, deletion/removal, and/or update of one or more contact entries. Both the client and server apply those operations so that at the end of the process, they have exactly the same contact entries in their respective address book.

The synchronization operation can be controlled by the controller 24 (e.g., address book application) and can occur at regular intervals or as needed, e.g., when a new contact entry is added to the address book 32 automatically. Since the address book 22 is stored at the network device 20 and may manage a number of different users, the address book 22 preferably stores a plurality of address books each for a different user or device.

In the method of FIG. 1, the remote device 10 sends the request to add, delete or modify a contact entry to the mobile device 30, the address book 32 of the mobile device 30 is then updated, and then the network's address book 22 may be synchronized to the address book 32 of the mobile device. In another example, the remote device 10 can send the request to add, delete or modify a contact entry to the network device 20 first, the network's address book 22 is updated, and then the mobile device's address book 32 may be synchronized to the network's address book 22. This example is illustrated in FIG. 2.

Figure 2:
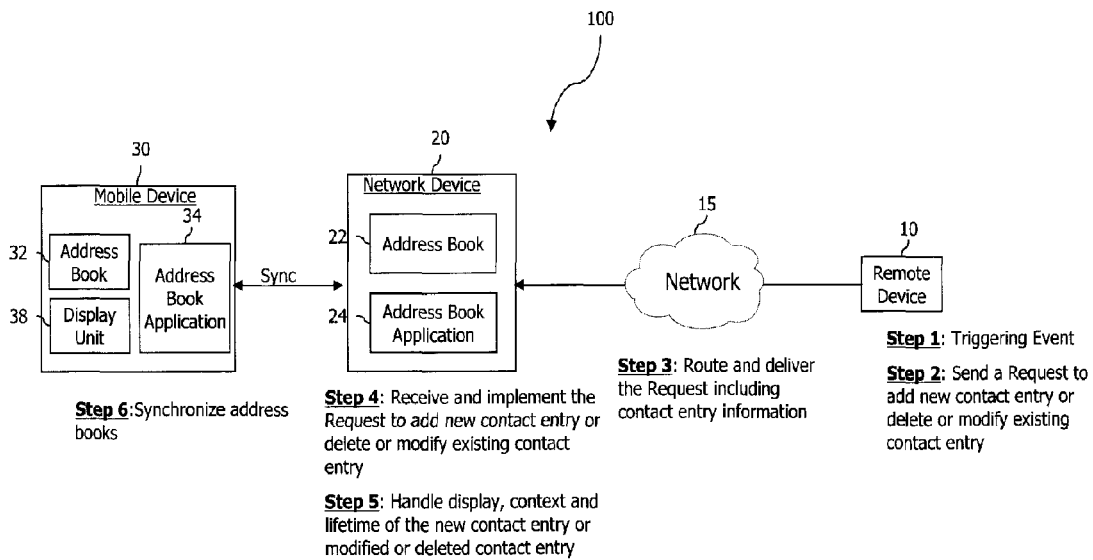
FIG. 2 is a diagram of a communication system and illustrates a method for providing an enhanced address book, according to another embodiment of the invention.

As shown in FIG. 2, steps 1-5 performed between the remote device 10 and the mobile device 30 in FIG. 1 are now performed between the remote device 10 and the network device 20. As a result, the address book 22 of the network device 20 is updated automatically first according to the requests to add, delete, or modify contact entries, which are sent from the remote device 10. If one of these steps 1-5 requires a notification to the user or an input from the user at the mobile device 30, then the network device 20 can send the notification or request for the input to the mobile device 30 through the network 15. In step 5 of FIG. 2, the address book application 24 of the network device 20 may display its address book 22 pertaining to the user of the mobile device 30 on a display associated with the network device 20.

Once the address book 22 at the network side is first updated, then in step 6 of FIG. 2, the address book 32 of the mobile device 30 is synchronized to the network's address book 22 to update the mobile device's address book 32. As a result, the same or similar information and contact entries are stored in each of the address books 32 and 22. And the user of the mobile device 30 can enjoy the automatic management of the address book 32 as well as the address book 22.

Figure 3:
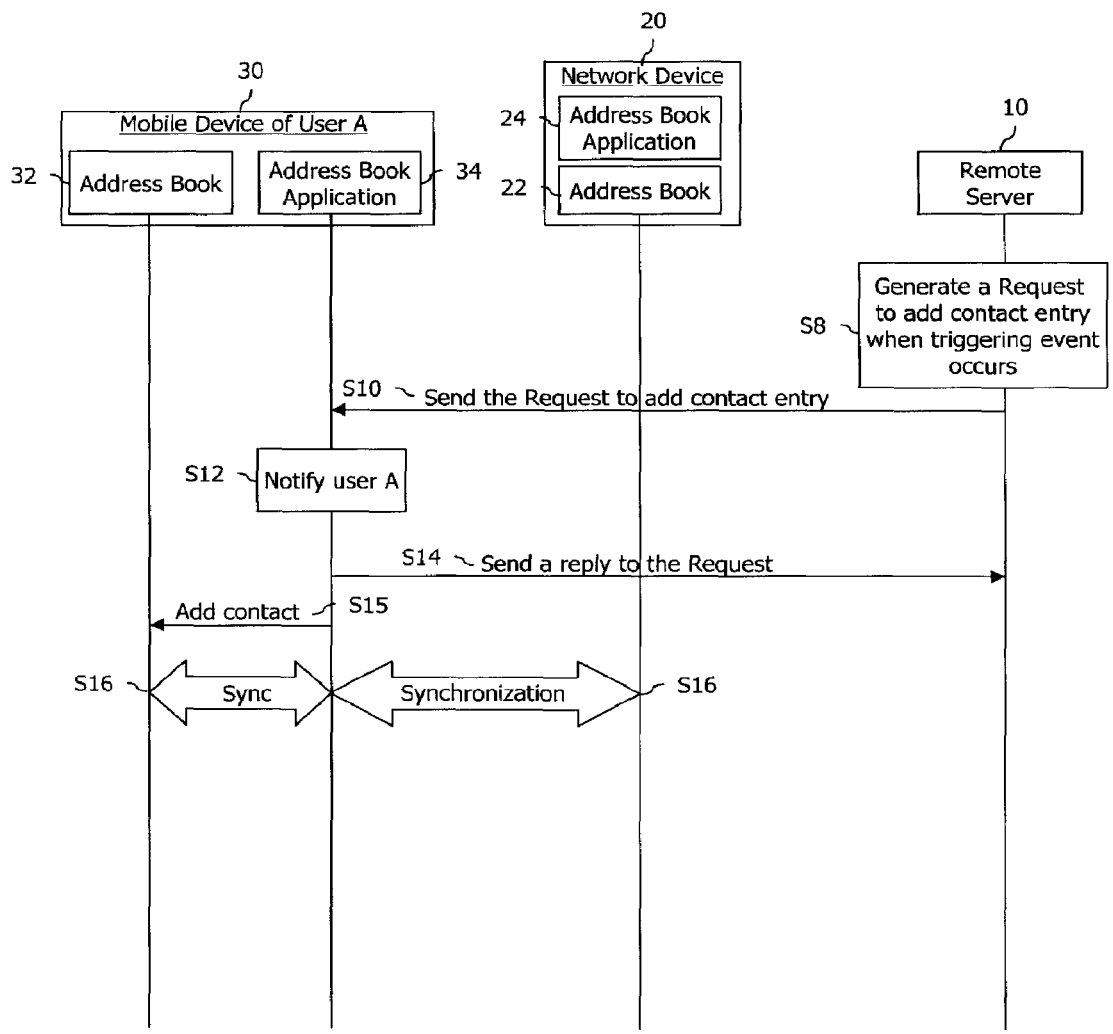
FIG. 3 is a diagram illustrating an example of a method of adding a contact entry to an address book according to an embodiment of the invention.
Figures 4, 5:
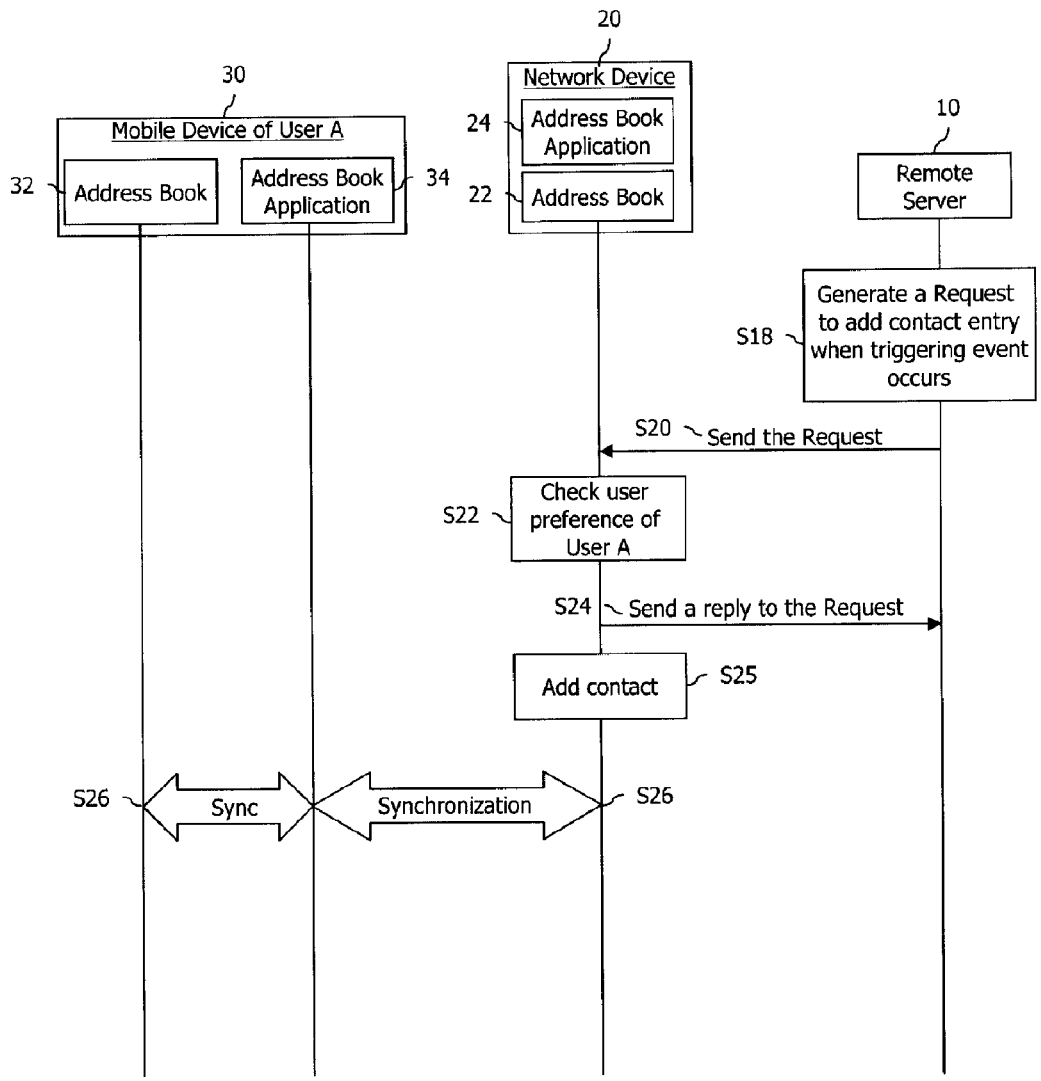
FIG. 4 is a diagram illustrating another example of a method of adding a contact entry to an address book according to an embodiment of the invention.
FIG. 5 is an example of a contact entry according to an embodiment of the invention.

Now two examples of the methods of FIGS. 1 and 2 will be described respectively referring to FIGS. 3 and 4, and are implemented in the systems of FIGS. 1 and 2. More specifically, FIG. 3 is an example of FIG. 1 and illustrates a method of adding a contact entry to an address book of a mobile device according to an embodiment of the invention. FIG. 4 is an example of FIG. 2 and illustrates a method of adding a contact entry to an address book of a mobile device according to another embodiment of the invention. Although the examples of FIGS. 3 and 4 discuss adding automatically a new contact entry to the address book, the inventive concepts are equally applicable to deleting or modifying automatically a contact entry in the address book.

Referring to FIG. 3, the remote device 10 is a server that is accessible remotely, e.g., through the Web. In this example, the remote server 10 provides a service for a plane ticket reservation. Once a user completes the reservation, the remote server 10 automatically sends a request to add a contact entry to the address book of the user (user's mobile device) so that the added contact entry may be used later, if needed, by the user, e.g., to obtain the reservation information again or modify the reservation by making a call from the user's mobile device using the added contract entry information (e.g., plane ticket reservation phone number).

As shown in FIG. 3, in step S8, when the remote server 10 determines that a certain event has occurred, this event automatically triggers the remote server 10 to generate a request to add a contact entry, which includes the contact entry to be added and optionally the context information associated with the contact entry to be added. For example, when a user A (e.g., using the mobile device 30 or other computer or device) makes an airline reservation through a specific airline website operating under the control of the remote server 10 and clicks on a "confirm button" to confirm the reservation, then the remote server 10 automatically generates a request to add a contact entry (e.g., airline reservation phone number or website address) to the user's address book. This contact entry can also include the reservation number and other information, and later can be used by the user to get information or modify his reservation by making a call from his mobile device 30. The contact entry to be added can include the phone number of the specific airline or their website address.

In step S10, the request to add the contact entry is sent over the network to the user A, for example within a SMS. To accomplish this, the remote server 10 can use the phone number of the user A that the user A may have provided to the remote server 10 during the airline ticket reservation. Alternatively, if the user A made his airline ticket reservation using the Internet browser of the user's mobile device 30, the request to add the contact entry may be sent over the Internet connection from the remote server 10 to the mobile device 30.

In step 12, upon reception of the request, the address book application 34 notifies the user A. For example, a message may be displayed on the display 38 of the mobile device 30 and the user can decide to accept or reject the request. In step 14, the address book application 34 replies to the remote server 10 to indicate if the request to add the contact entry was accepted or rejected by the user A.

In step 15, if the user A accepts the request, the new contact entry is automatically added to the address book 32 of the mobile device 30 of the user A. In step S16, the contact entry is automatically added to the address book 22 of the network device 20 through a synchronization operation with the address book 32, e.g., using an OMA DS operation. This step may be performed at regular intervals. Accordingly, the invention allows an automatic addition, deletion, and modification of contact entries to the address book according to actions of the user and contexts of those actions.

In another example, referring to FIG. 4, step 18 is identical to step 8 of FIG. 3 and thus the description thereof is omitted. In step S20, the request to add the contact entry is sent over the network to the network device 20. For example, the CPM (Converged IP Messaging) address of the user A may have been provided to the remote server 10 during the airline ticket reservation, and the remote server 10 uses the CPM address to send the request to the network device 20, e.g., to the address book application 24 for the user A.

In step S22, upon reception of the request, the networks' address book application/controller 24 checks the user preferences of the user A to determine whether the request should be accepted or rejected. The preferences of one or more users may be stored in the network device 20 and indicate if the corresponding user prefers to automatically add any contact entry, or delete or modify an existing contact entry to the user's address book. In step S24, the network's address book application 24 replies to the remote server 10 to indicate if the request was accepted or rejected.

In step S25, if the user's preference indicates that the request can or should be accepted, then the new contact entry is automatically added to the address book 22 of the network device 20. In step S26, under control of the address book applications 24 and 34, the network's address book 22 synchronizes its content with the address book 32 of the mobile device 30 using a synchronization method such as an OMA DS operation. This step may be performed at regular intervals or as needed.

Once the contact entry is stored in the address book according to the methods of FIGS. 1-4, the address book application may use information associated with the contact entry to manage the displaying, availability, and relevancy of the contact entry. For instance, the address book application 34 can use the context information associated with each contact entry to determine if the contact entry should be displayed to the user, deleted from the address book 32, modified in the address book 32, etc. In this regard, FIG. 5 illustrates one non-limiting example of a contact entry including location information as part of its context information according to an embodiment of the invention.

As shown in FIG. 5, the contact entry can include a name field 51, a phone number field 52, an e-mail field 53, an expiry date field (or lifetime field) 54 for storing one or more expirations dates of the contact entry, a location field 55 for storing one or more GPS coordinates associated with the contact entry, and a matching context field 56 for indicating if there is a context match. For instance, the matching context field 56 may be set to "yes" if the current location of the user (mobile device 30) matches one of the locations indicated in the location field 55. And the address book application 34 can display the corresponding contact entry if the matching context field 56 is indicated as 'yes', or can delete the corresponding contact entry if the current date matches the date identified in the expiry date field 54. The matching context field 56 may be updated continuously or at regular intervals or as needed.

Figure 6:
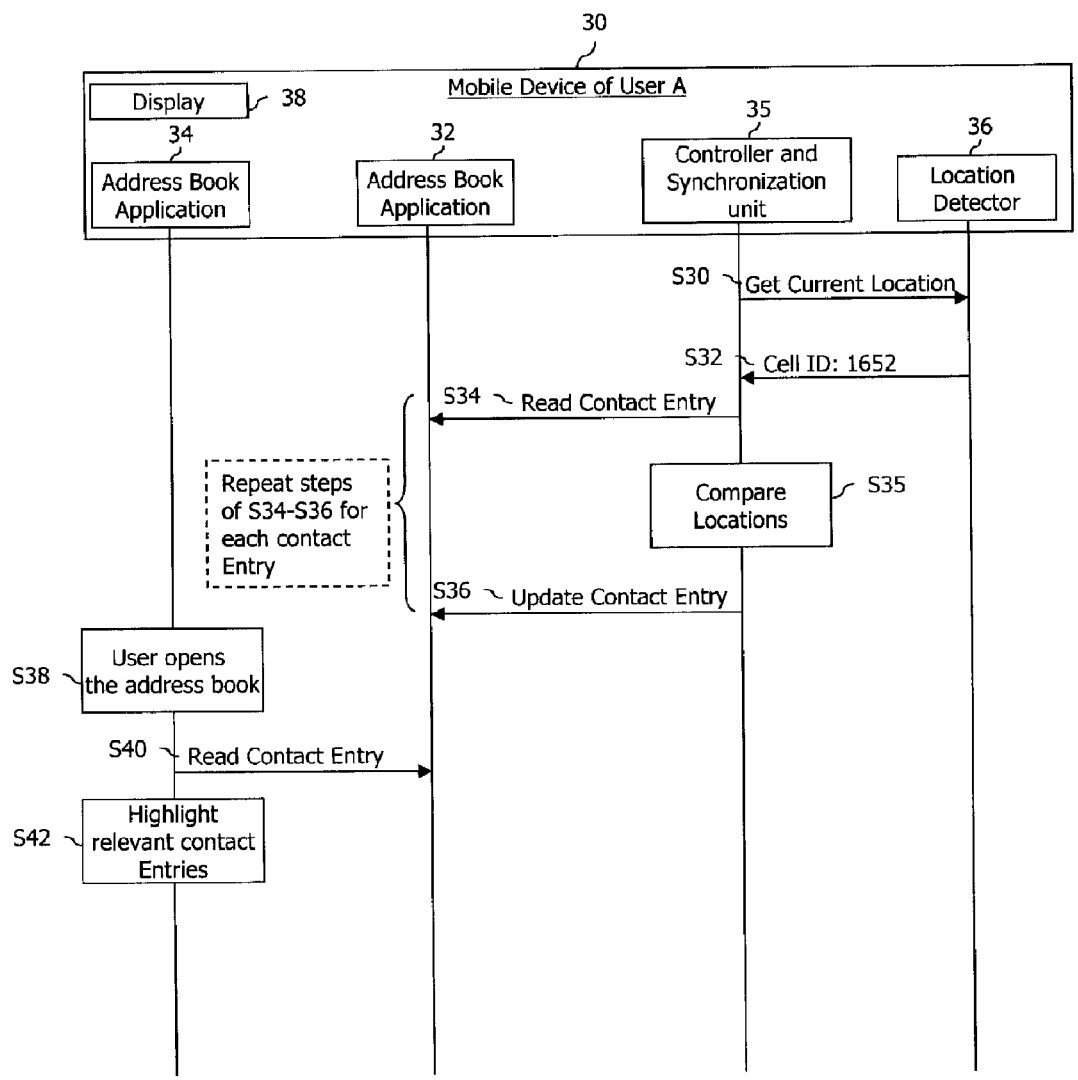
FIG. 6 is a diagram illustrating an example of a method of displaying an address book using context information according to an embodiment of the invention.

FIG. 6 is a diagram of a mobile device 30 and its method of displaying contact entries based on context information associated with the contact entries according to an embodiment of the invention. In the example of FIG. 6, the address book application 34 uses the GPS location(s) associated with contact entries to highlight only those entries that are relevant to the user at the user's current location. The mobile device 30 of the user also includes a location detector 36 for determining a current location of the user/mobile device 30 as well as a controller and synchronization unit 35. The controller and synchronization unit 35 may be separate entities if desired.

Referring to FIG. 6, in steps S30 and S32, the controller 35 obtains the current location of the mobile device 30, for example, by requesting the current Cell ID from the location detector 36. The location detector 36 obtains the current location of the mobile device 30 using known location calculation techniques. In this example, the controller 35 receives from the location detector 36 that the current cell ID of the mobile device 30 is, e.g., '1651'.

In steps S34 and S35, for each contact entry, the controller 35 reads the contact entry, and compares the list of GPS coordinate(s) indicated in the location field (e.g., field 55 in the example of FIG. 5) of the contact entry with the current location (e.g., cell ID of the mobile device 30) obtained from the location detector 36. In step S36, if one of these locations identified in the location field of the contact entry is close enough or within a certain range to the current location of the mobile device 30, then the controller 35 updates the corresponding contact entry in the address book 32 by setting the matching context field (e.g., field 56 in the example of FIG. 5) of the contact entry to "yes". Otherwise, the matching context field of the contact entry is set to "no." Instead of being controlled by the controller 35, steps S34-S36 may be controlled by the address book application 34.

Steps S30-S36 can be performed repeatedly at regular intervals.

In step S38, the user opens his address book application 34, for example, in order to make a phone call. In step S40, the address book application 34 accesses the contact list from the address book 32. In step S42, the address book application 34 displays one or more contact entries, which can occur based on the context information or per the user's request or preference. For example, the address book application 34 may display only those contact entries having the 'yes' value in their matching context field, on the display unit 38. In another example, the address book application 34 may make those contact entries more visible and accessible to the user, for example by highlighting them. In another example, all other non relevant contact entries may be shadowed out so they become non-selectable by the user. Thus, the present invention allows an automatic display of only relevant contact entries depending on the location of the user, current time, etc., and this display is automatically managed to be in formats that would differentiate the relevant contact entries from all other contact entries in a user-friendly manner.

According to another embodiment, the present invention can be effectively integrated into an OMA CAB (Open Mobile Alliance Converged Address Book) architecture by modifying the conventional architecture as follows:

- providing an interface to the Address Book XDMS (XML (extensible markup language) Data Management Server) server, which would enable remote entities to add contact entries to the address book of a user,
- adding additional fields to Address Book contact entries (such as expiry time, location information, etc.), and
- adding additional user preference in XDMS related to this new functionality such as whether or not the user allows the remote network elements to add contact entries to his address book, etc.

According to the various examples and embodiments, the present invention provide an enhanced address book which is automatically managed and updated and is configured to present contact entries according to the user preference or relevance. The present invention provides an automatic addition, deletion or modification of a contact entry to the user address book upon request from a remote entity. Further, the present invention provides the use of context information (e.g., location, time of the day, user status, etc.) to highlight those contacts that are relevant to the user, and hide or show in a more discreet way other contacts that may be irrelevant to the user considering the current context. Moreover, the present invention allows handling of expiry date information (lifetime information) associated with the contact entries so that those contact entries would automatically disappear from the address book when they are no longer needed. Accordingly, the present invention provides an effective address book, which is less time consuming to manage and update, and which is current and automated for the user.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile terminal comprising:
a display unit;
a mobile terminal address book; and
a controller configured to receive an update request including at least one contact entry for updating the mobile terminal address book from a remote device when the mobile terminal enters into a particular area, to automatically update the mobile terminal address book based on the at least one contact entry in the received update request, to transmit information indicating whether the at least one contact entry successfully updated to the mobile terminal address book or not to the remote device, to synchronize the updated mobile terminal address book with a network address book through a network, and to control the display unit to display one or more contact entries stored in the updated mobile terminal address book including the at least one contact entry according to context information associated with each of the one or more contact entries,
wherein the at least one contact entry in the update request has been filtered by the remote device according to a preset policy based on user preferences of the mobile terminal,
wherein the context information includes location information and lifetime information associated with each of the one or more contact entries, and the display unit displays the one or more contact entries having the location information that matches current location information of the mobile terminal,
wherein the controller controls the display unit to display the automatically updated at least one contact entry differently than contact entries that are manually added to the mobile terminal address book, and
wherein the controller automatically removes the one or more contact entries from the mobile terminal address book according to the lifetime information associated with each of the one or more contact entries.

2. The mobile terminal of claim 1, wherein each of the at least one contact entry stored in the mobile terminal address book includes information related to the remote device.

3. The mobile terminal of claim 1, wherein each of the at least one contact entry stored in the mobile terminal address book includes context information indicating a context in which the corresponding contact entry is to be used.

4. The mobile terminal of claim 1, wherein the controller is further configured to receive the update request of the at least one contact entry from the remote device when the mobile terminal user makes a reservation for a predetermined airplane, makes a reservation for a predetermined hotel, subscribes to a predetermined service, or buys a predetermined product or predetermined service online.

5. A method of controlling a mobile terminal address book provided in a mobile terminal, the method comprising:
receiving, by the mobile terminal, an update request including at least one contact entry for updating the mobile terminal address book from a remote device when the mobile terminal enters into a particular area;
automatically updating the at least one contact entry of the mobile terminal address book based on the at least one contact entry the received update request;
transmitting, by the mobile terminal, information indicating whether the at least one contact entry successfully updated to the mobile terminal address book or not to the remote device;
synchronizing the updated mobile terminal address book with a network address book through a network; and
displaying, on a display unit of the mobile terminal, one or more contact entries stored in the updated mobile terminal address book including the at least one contact entry according to context information associated with each of the one or more contact entries,
wherein the at least one contact entry in the update request has been filtered by the remote device according to a preset policy based on user preferences of the mobile terminal, and
wherein the context information includes location information and lifetime information associated with each of the one or more contact entries, and the display unit displays the one or more contact entries having the location information that matches current location information of the mobile terminal,
wherein the controller controls the display unit to display the automatically updated at least one contact entry differently than contact entries that are manually added to the mobile terminal address book, and wherein the controller automatically removes the one or more contact entries from the mobile terminal address book according to the lifetime information associated with each of the one or more contact entries.

6. The method of claim 5, wherein each of the at least one contact entry stored in the mobile terminal address book includes information related to the remote device.

7. The method of claim 5, wherein each of the at least one contact entry stored in the mobile terminal address book includes context infounation indicating a context in which the corresponding contact entry is to be used.

8. The method of claim 5, wherein the receiving by the mobile terminal the update request of the at least one contact entry from the remote device is performed when the mobile terminal user makes a reservation for a predetermined airplane, makes a reservation for a predetermined hotel, subscribes to a predetermined service, or buys a predetermined product or predetermined service online.

9. A mobile terminal comprising:
- a display unit;
- a mobile terminal address book;
- a synchronization unit configured to synchronize the mobile terminal address book with a network address book through a network, the synchronized mobile terminal address book including at least one contact entry having at least one location information; and
- a controller configured to compare cell identification information of the mobile terminal with the at least one location information, to update the mobile terminal address book to output at least one contact entry corresponding to a location associated with the cell identification information based on the comparison result, and to control the display unit to display one or more contact entries stored in the updated mobile terminal address book including the at least one contact entry according to context information associated with each of the one or more contact entries, wherein the context information includes location information and lifetime information associated with each of the one or more contact entries, and the display unit displays the one or more contact entries having location information that matches a current location information of the mobile terminal, wherein the controller controls the display unit to display the automatically updated at least one contact entry differently than contact entries that are manually added to the mobile terminal address book, and wherein the controller automatically removes the one or more contact entries from the mobile terminal address book according to the lifetime information associated with each of the one or more contact entries.

\* \* \* \* \*